United States Patent [19]

Altman et al.

[11] Patent Number: 4,592,628

[45] Date of Patent: * Jun. 3, 1986

[54] MIRROR ARRAY LIGHT VALVE

[75] Inventors: Carl Altman, Lagrangeville; Ernest Bassous, Riverdale; Carlton M. Osburn, Yorktown Heights; Peter Pleshko, Staatsburg; Arnold Reisman, Yorktown Heights; Marvin B. Skolnik, Kingston, all of N.Y.

[73] Assignee: International Business Machines, Armonk, N.Y.

[*] Notice: The portion of the term of this patent subsequent to Mar. 3, 2002 has been disclaimed.

[21] Appl. No.: 279,392

[22] Filed: Jul. 1, 1981

[51] Int. Cl.$^4$ .............................................. H01J 31/24
[52] U.S. Cl. .................................... 350/486; 350/269; 350/360; 313/465; 358/60
[58] Field of Search ............... 350/269, 360, 361, 486; 313/465; 358/60

[56] References Cited

U.S. PATENT DOCUMENTS

| 2,025,143 | 12/1935 | Zworykin | 350/269 |
| 2,681,380 | 6/1954 | Orthuber | 358/60 |
| 3,746,911 | 7/1973 | Nathanson et al. | 350/361 |
| 3,886,310 | 5/1975 | Guldberg et al. | 350/360 |
| 3,896,338 | 7/1975 | Nathanson et al. | 358/60 |

OTHER PUBLICATIONS

Wohl, R. J., Four Fold Increased Resolution or Color DPOT", *IBM Technical Disclosure Bulletin*, vol. 19, No. 4 (Sep. 1976) pp. 1419–1420.

IBM Technical Disclosure Bulletin, vol. 13, No. 8, Aug. 1970, pp. 603–604 (Langner) "CRT Display Target".

IBM Technical Disclosure Bulletin, vol. 21, No. 3, Aug. 1978, pp. 1248–1249 (J. M. Blum et al.) "Method for Making Mirror Array Light Valves".

Primary Examiner—R. A. Rosenberger
Attorney, Agent, or Firm—Frederick D. Poag

[57] ABSTRACT

A mirror array light valve is described comprising a transparent substrate, a plurality of post members arranged in a regular array on said substrate, and a plurality of deflectable square, rectangular, hexagonal or the like light-reflecting elements arranged in a regular array on said post members such that a post member is positioned under a corresponding corner of each element; methods for making the mirror array light valve are also described.

2 Claims, 4 Drawing Figures

MIRROR ARRAY LIGHT VALVE

BACKGROUND OF THE INVENTION
1. Field of the Invention

This invention relates to a mirror array light valve adapted for use with e.g., a cathode-ray tube in conjunction with Schlieren optics forming a system for projecting images upon a display screen.

2. Description of the Prior Art

In forming an image pattern corresponding to a cathode-ray pattern for projection, several techniques are employed. One common technique employs a fluorescent screen containing phosphors which are excited at high energy levels in order to produce an image on the screen. Such a system is employed in commercial television. However, the area of utility for such fluorescent screens is limited, and as the area over which it is desired to project a display becomes larger, other systems must be used.

One such system is the oil film eidophor system, in which an external light source is spatially modulated by an oil film the surface of which is rippled by an electron beam in the cathode-ray tube. The oil eidophor system is very complex, expensive, and subject to cathode deterioration due to the presence of the oil film in the vacuum tube.

An alternative to the eidophor system is to employ an array of deflectable mirror elements in conjunction with an external light source; the mirror elements are deflectable in response to the cathode-ray signal. Such systems are described, for example, in U.S. Pat. No. 2,681,380, issued June 15, 1954, and in IBM Technical Disclosure Bulletin, Volume 13, number 8, August 1970, pages 603-604, both of which describe rectangular edge-mounted mirror elements.

More recently, U.S. Pat. No. 3,746,911, issued July 17, 1973 describes an electrostatically deflectable light valve for use in a large area projection display in which the elements of the array are comprised of a centrally-located post supporting a reflective element, and U.S. Pat. No. 3,886,310, issued May 27, 1975 describes similar electrostatically deflectable light valves in which each element is divided into four wing portions which are oriented so as to be deflectable in four different directions, and which thereby reflect external light to four separate quadrants.

SUMMARY OF THE INVENTION

The present invention relates to a novel mirror array light valve comprising (a) a transparent substrate, (b) a plurality of post members arranged in a regular array on said substrate, and (c) a plurality of deflectable square, rectangular, hexagonal or the like light-reflecting elements arranged in a regular array on said post members such that a post member is positioned under a corresponding corner of each element. The invention also relates to methods for making such a mirror array light valve.

A mirror array light valve according to the present invention provides improved image resolution and contrast compared with prior art systems.

The foregoing and other objects, features and advantages of the invention will be apparent from the following more particular description of preferred embodiments of the invention, as illustrated in the accompanying drawings.

DETAILED DESCRIPTION

According to the present invention, the mirror array light valve includes a plurality of deflectable square, rectangular, hexagonal or similar generally symmetrical, tightly packable light reflecting elements arranged in a regular array, with each light reflecting element being supported on a post member, and with the post members being positioned under a corresponding corner of each element. Thus the light reflecting elements are essentially cantilever mounted, resulting in favorable deflection properties for the elements, due to the restricted area occupied by the post member and its location under a corner of the element.

The square shape is preferred for the light reflecting elements in view of human factor requirements and because the square shape is well adapted to provision of a dense rectilinear array for ease of addressing via a raster system, but the rectangular and other shapes are potentially useful.

By the positioning of the supporting post members under corresponding corners of each element, each of the light reflecting elements is rendered deflectable in the same direction, so that the reflected light is directed to a single quadrant. By use of Schlieren optics, light can be blocked in three quadrants, to permit transmission only of the light shifted by the deflection of the light reflecting elements in the mirror array light valve of the invention through the fourth quadrant, thereby significantly reducing background light in the display.

The mirror array light valve of the invention can be prepared by several methods.

In general, first a silicon surface layer is formed on a substrate comprising a transparent vitrous material, such as quartz, sapphire, or spinel. The silicon layer may be an epitaxial, polycrystalline, or amorphous layer formed by chemical vapor deposition of silicon.

By a sequence of treatment steps including resist masking, etching, chemical conversion, and metallization a regular array of elements, supported by corresponding corner-position posts, in the desired pattern, e.g., square, is obtained, as is described in detail below.

Figure 1:
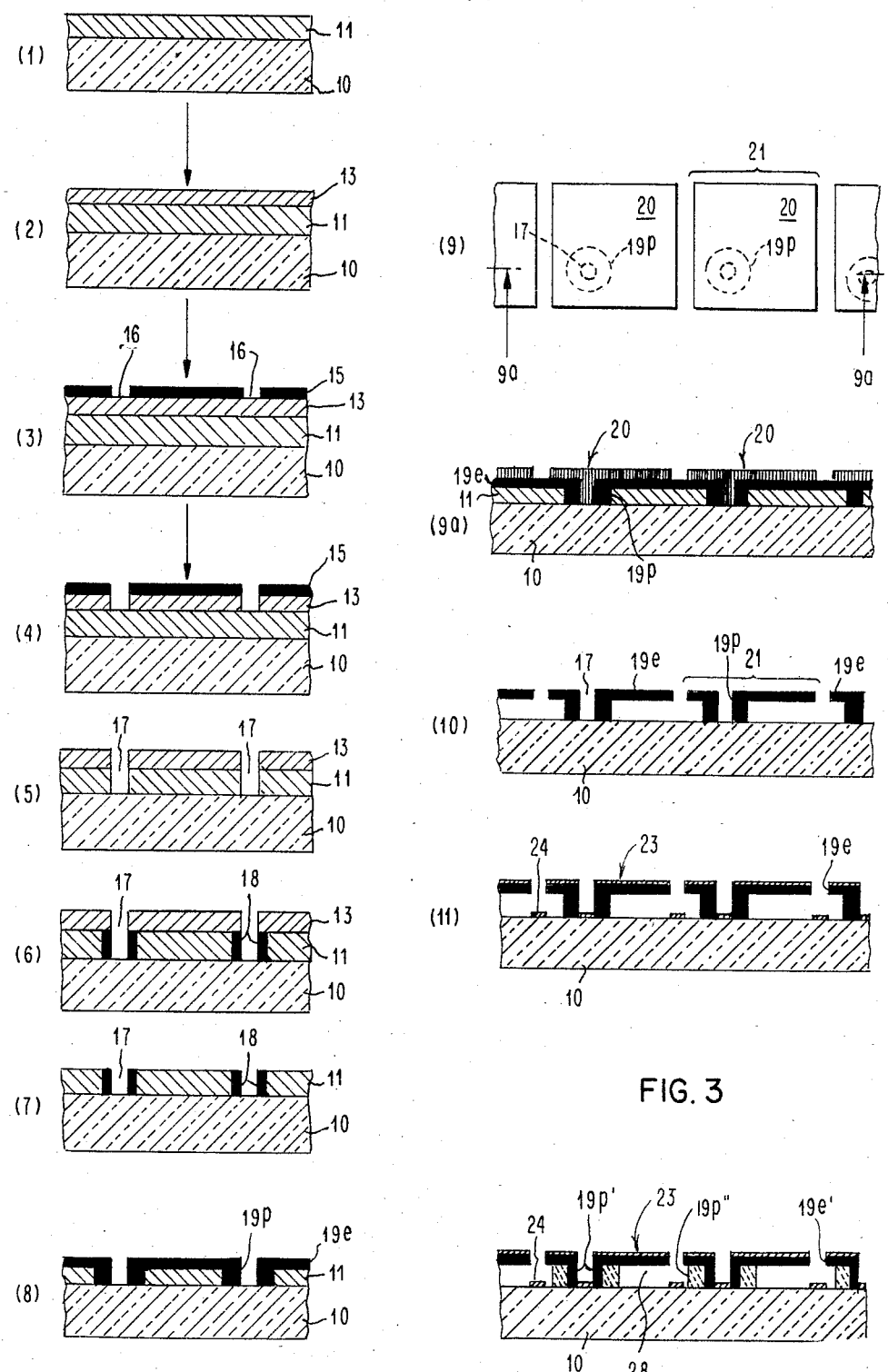
FIG. 1 schematically illustrates in cross-section the various stages of a preferred method of making a mirror array light valve according to the invention.

FIG. 1 shows a preferred method according to the invention. As illustrated in Step (1) of FIG. 1, a layer of etchable silicon 11, e.g., single crystal silicon, is applied to a transparent substrate 10, e.g., sapphire substantially free of optical distortion, by, e.g., chemical vapor deposition.

Then, in Step (2) an n-dopant diffusion barrier layer 13 is formed on the silicon layer 11. By an n-dopant is meant an element which, in its electronically neutral state, has one more electron in its highest occupied orbital than does the element being doped. With respect to silicon, the n-dopants are phosphorous, antimony, and arsenic. The n-dopant diffusion barrier layer may be thermally grown silicon dioxide, or vapor deposited silicon dioxide or silicon nitride for example.

The barrier layer is then masked with a first resist pattern 15 so that no resist is present in areas 16 corresponding to the desired pattern of the plurality of post members. This is shown in Step (3).

Then, in Step (4), the portions of the barrier layer 13 underlying the areas 16 and thus unprotected by the resist pattern 15, i.e., areas corresponding to the desired post member locations, are removed, e.g., by reactive ion etching. This yields an n-dopant diffusion barrier layer having openings corresponding to the locations at which it is desired to form the plurality of post members. Following this, the resist pattern 15 is removed.

Then, in Step (5), the silicon layer 11 portions unprotected by the barrier layer 13 are etched through to the substrate layer 10 using reactive ion etching to obtain straight sided holes 17 perpendicular to the substrate 10.

In Step (6), an n-dopant, which is preferably phosphorous, is diffused laterally into the silicon layer at the post locations where the silicon layer is not protected by the n-dopant diffusion barrier and where it is desired to form the plurality of post members. By this step, cylindrical layers 18 of n+-doped silicon are formed in the silicon body 11, in the portions thereof defining the side walls of the holes 17.

The n-dopant diffusion mask 13 is then removed, Step (7). In Step (8), thermal oxide having tubular and flat portions 19p and 19e is grown on the silicon layer 11 at a temperature where the oxidation rate of the n+-doped silicon is approximately three times that of the undoped silicon. This temperature is preferably about 800° C. This step results in slight narrowing of the holes 17 but, more importantly, a relatively thick cylindrical or tubular post structure 19p of oxide in and at the walls of the holes 17. The posts 19p are continuous with thinner oxide flat portions 19e and form the support for the same in the final structure.

Step (9) is shown in both plan and section (9a) diagrams. In this step, a second resist pattern with the resist areas defining an array of discrete areas 20 arranged such that a corresponding corner of each area is positioned over a location of the silicon layer containing the thermal silicon dioxide cylindrical post 19p previously formed by oxidation of the n+-doped silicon. The areas 20 shown have the preferred square shape and orthogonal grid arrangement.

Then the thermal silicon dioxide surface layer 13 is (preferably reactive ion) etched to form a plurality of elements 21 therein corresponding to the mask areas 20, arranged in a regular array with a silicon dioxide post 19p under a corresponding corner of each of the silicon dioxide elements. The resist is then removed and the silicon is etched away using an etchant which attacks the silicon but not the silicon dioxide to leave the desired structure, Step (10). A suitable etchant is pyrocatechol ethylenediamine, for example.

Lastly, as shown in Step (11), a thin film of a reflective metal, preferably aluminum, is deposited onto the array to form a plurality of electrically isolated, individually electrostatically deflectable light reflecting elements 23, with a conductive counter-electrode grid 24 of the reflective metal being formed on the substrate surface corresponding to the interstices between the light reflecting elements. Preferably this metallization step is by vacuum deposition. The metal should be as thin as possible, consistent with the desired reflectivity and conductivity, typically about 300 Å. Some of the metal is deposited within the posts as well, but this is of no significant consequence. As set forth below, the Schlieren stop will intercept most of the scattered light resulting from the presence of such structures.

Figure 3:
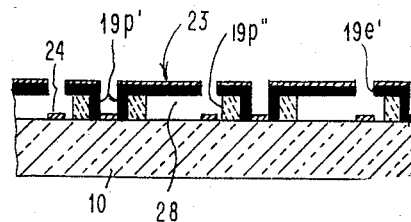
FIG. 3 illustrates the structure resulting from an alternative process.
Figure 2:
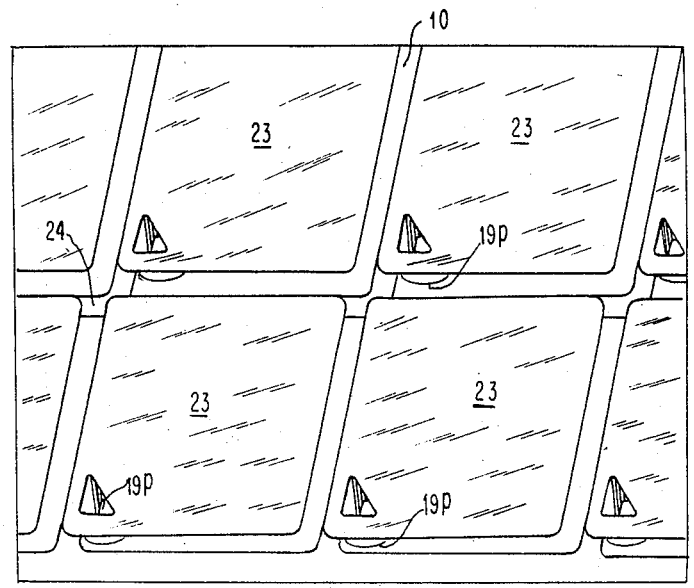
FIG. 2 illustrates an enlarged perspective view of portion of a mirror array light valve according to the present invention.

FIG. 2 shows the resulting light valve structure, including the elements 23, the grid 24, and the posts 19p on the substrate 10. In the configuration shown in FIG. 2, the cylindrical posts are hollow and of generally triangular cross-section. They could be solid cylinders as set forth below. In either case, the illustrated triangular shape facilitates placement of the posts near the corner of corresponding element 23. The showing of FIG. 2 is more representative of desirable geometry, while the showings of FIG. 1 and FIG. 3 are distorted to illustrate the various process steps clearly.

Because the cylindrical posts 19p are straight-sided and perpendicular to the substrate, they do not interfere with the deflection of adjacent elements 23 or the formation of the counter-electrode grid 24. Moreover, as will be set forth hereinafter, a preferred optical arrangement for utilization of the light valve structure involves a light path through the substrate 10 and the valve element components 19e to the underside of the reflective elements 23. In such case it is an advantage that the posts are shaped and disposed to allow light applied to the elements through the substrate to be reflected from substantially the entire available reflective area of each element 23.

The straight-sided configuration results from the fact that the posts are formed by wall modification, from the inside outwardly into the mass of undoped silicon; see Step (6). This results in hollow or tubular cylindrical posts. If desired, hole dimensions and oxide growth duration may be made such that the cylinders are vertically filled, or the apertures therein can be filled by appropriate masking and deposition steps with another substance such as chemically vapor deposited silicon dioxide, in either case resulting in solid cylindrical posts.

An alternative method of producing the valve structure is to use a p-dopant such as boron instead of phosphorous to produce p+-doped sidewalls, and perform the oxidation at 1000° C. FIG. 3 shows the result. An anisotropic etchant such as pyrocatechol ethylenediamine (R. M. Finne and D. L. Klein, J. Electrochem. Soc. 114:965 (1965)) will preferentially dissolve the undoped silicon (not shown) away from the volume 28 under the silicon dioxide valve element 19e' and up to the p+-doped silicon 19p''. The final structure, which is mechanically similar and optically equivalent to that previously described, will be produced with a post 19p' and a silicon dioxide deformable member 19e'. The post 19p' will consist essentially of p+-doped silicon 19p'' coated with thin oxide, continuous with element 19e', in its hollow portion.

Figure 4:
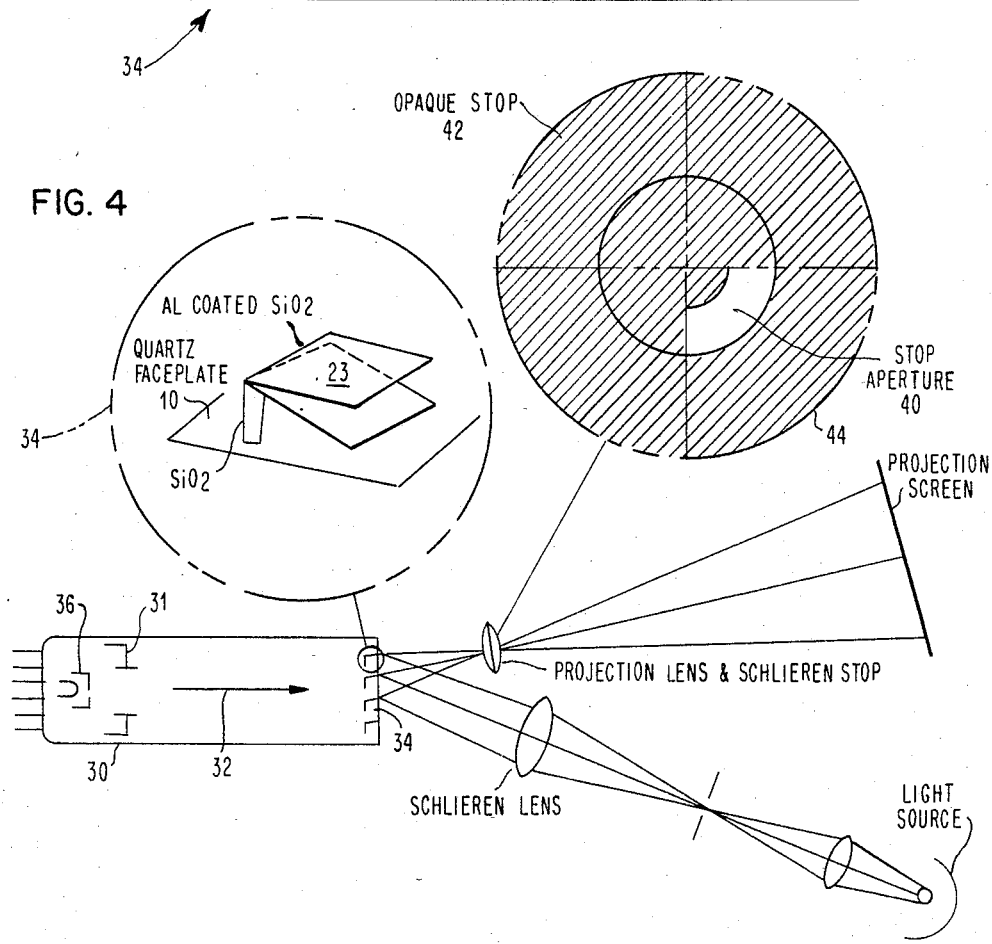
FIG. 4 is a diagrammatic showing of a light valve projection system employing a mirror array of the kind shown in FIG. 2.

FIG. 4 shows the use of the light valve structure in a display. A cathode ray tube 30 has deflection means 31 whereby electron beam 32 is directed to various locations on light valve array 34. Typically, this is done in an overall pattern such as a raster pattern. Concurrently, beam current is modulated by control grid 36, with the result that charges of various amplitudes are placed on the individual array elements. Light passes from the light source, through the Schlieren lens and the face plate of tube 30 to the light valve structure 34. Light reflected from valve structure 34 passes through the projection lens and the aperture 40 of the Schlieren stop 42 to the projection screen; as in conventional Schlieren systems, the stop is located in the focal plane of the projection lens.

However, in the system of the present invention, the stop has a specially shaped aperture to cooperate with the light valve structure of the invention. The placement of the post at the same corner of each and every deflectable light valve element 23 causes light reflected from the deflected elements to be directed toward the same quadrant 44 of the Schlieren stop 42. The stop aperture 40 is located in that quadrant. The stop 42 receives the diffraction pattern caused by the various reflecting structures of the light valve. Light from the undeflected elements 23 and the fixed structures of the light valve, such as the grid 24, are imaged onto the stop in all four quadrants.

By transmitting the light from the deflected elements 23 through only one quadrant, that having the aperture 40, and blocking all other light that is incident on the other quadrants of the stop 42, the contrast ratio is enhanced over that achievable with the conventional stop. Such a conventional stop blocks primarily only the diffraction pattern caused by the undeflected elements. Light diffracted by the finer structures such as the grid passes such conventional stops substantially unblocked.

While the invention has been particularly shown and described with reference to preferred embodiments thereof, it will be understood by those skilled in the art that various changes in form and detail may be made therein without departure from the spirit and scope of the invention.

Having thus described our invention, what we claim as new, and desire to secure by Letters Patent is:

1. A mirror array light valve comprising an array of deformable light reflected elements, each of said elements being supported by a post member extending from a base member, said post member being straight-sided, the joint between said post and said element being at the edge of the element and being confined to a small portion of said edge, said posts comprising hollow cylinders formed by a self-limiting etching process comprising forming a straight-sided hole in a silicon body, processing the interior surface of said hole to convert to material which is resistant to a silicon etch, and etching away the body of silicon not so converted by said processing.

2. A mirror array light valve according to claim 1 wherein said elements comprise portions etched from a thin layer formed on said silicon body prior to said etching away of said body.

* * * * *